(No Model.) 5 Sheets—Sheet 2.
J. T. GOODFELLOW.
SYSTEM OF LAYING SUBTERRANEAN LINES OF ELECTRIC WIRES.
No. 272,833. Patented Feb. 20, 1883.
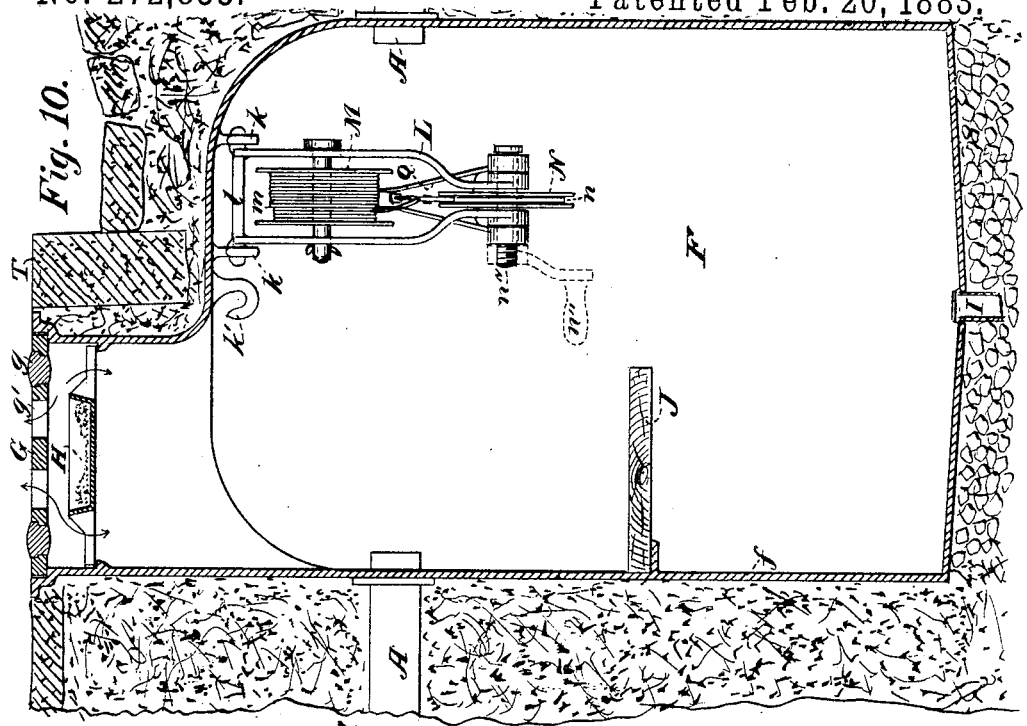
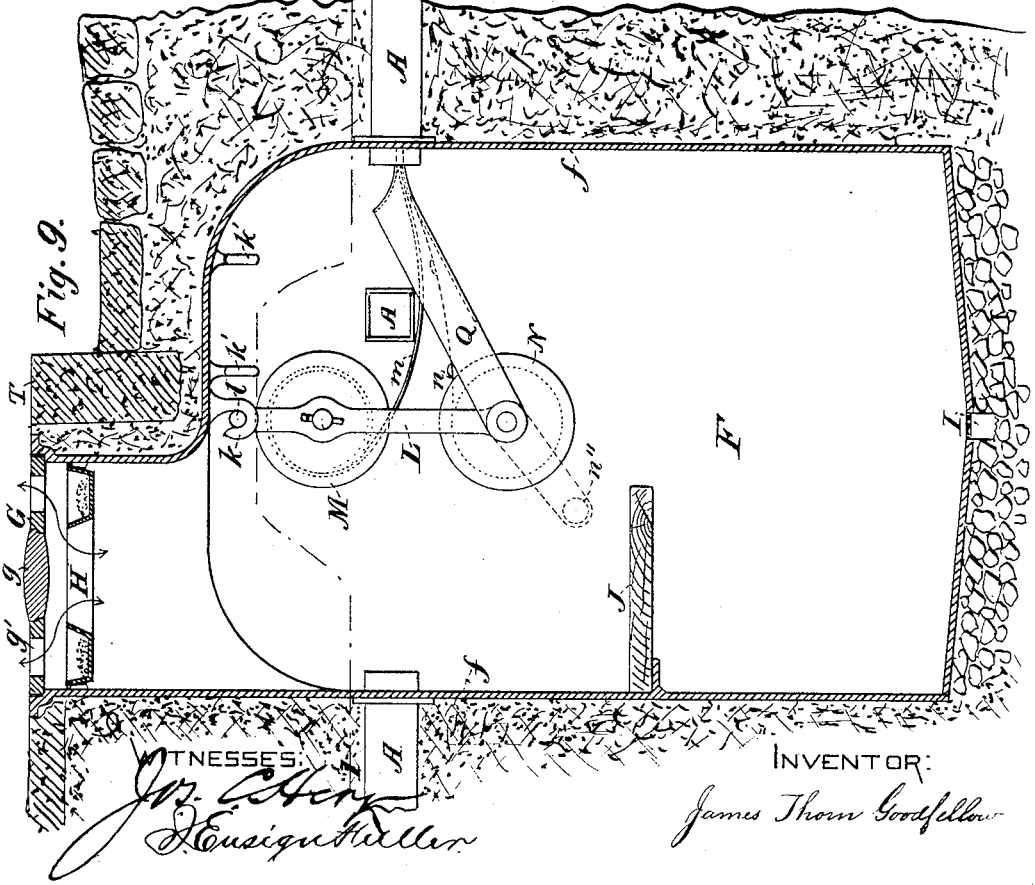
WITNESSES:
INVENTOR:
James Thorn Goodfellow

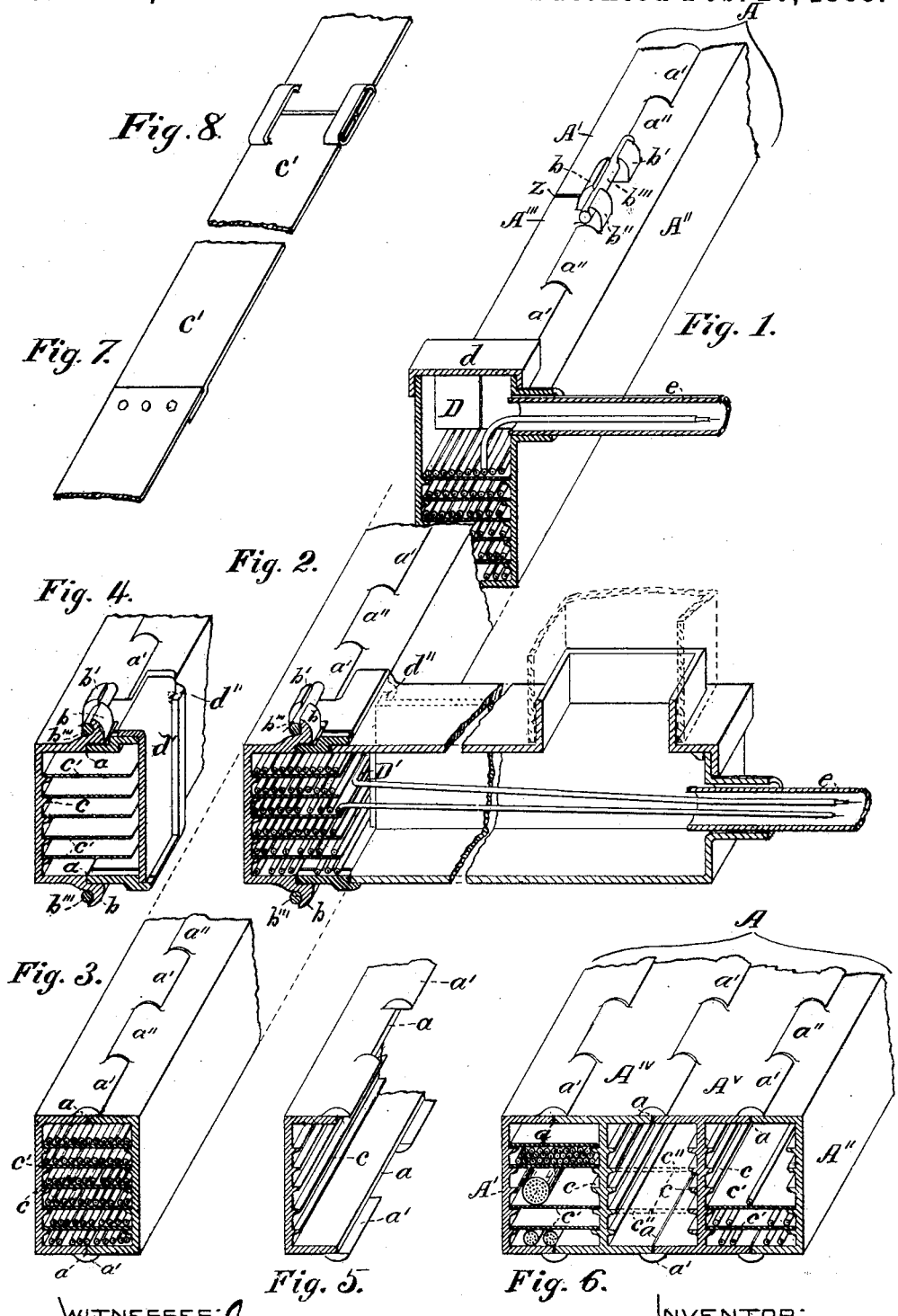

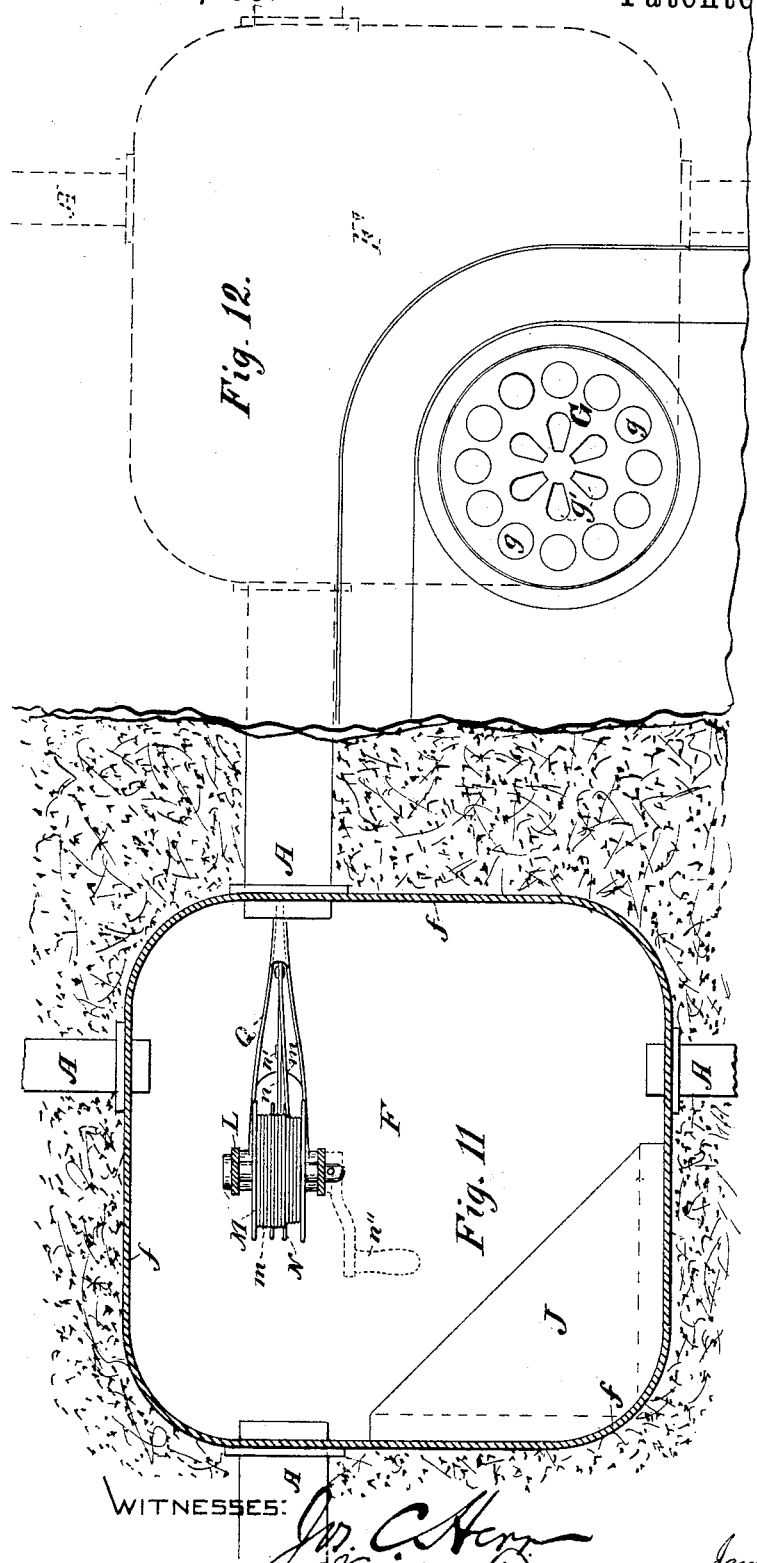
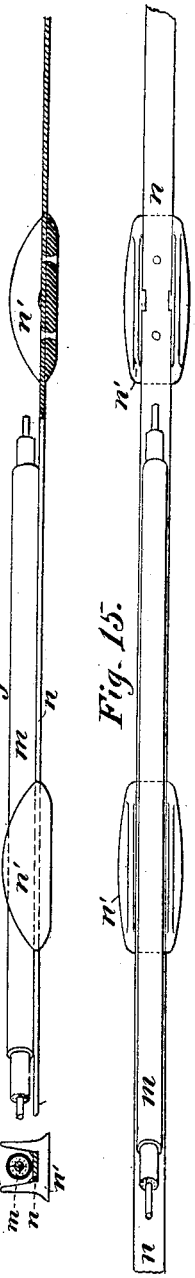

(No Model.) 5 Sheets—Sheet 4.
J. T. GOODFELLOW.
SYSTEM OF LAYING SUBTERRANEAN LINES OF ELECTRIC WIRES.
No. 272,833. Patented Feb. 20, 1883.
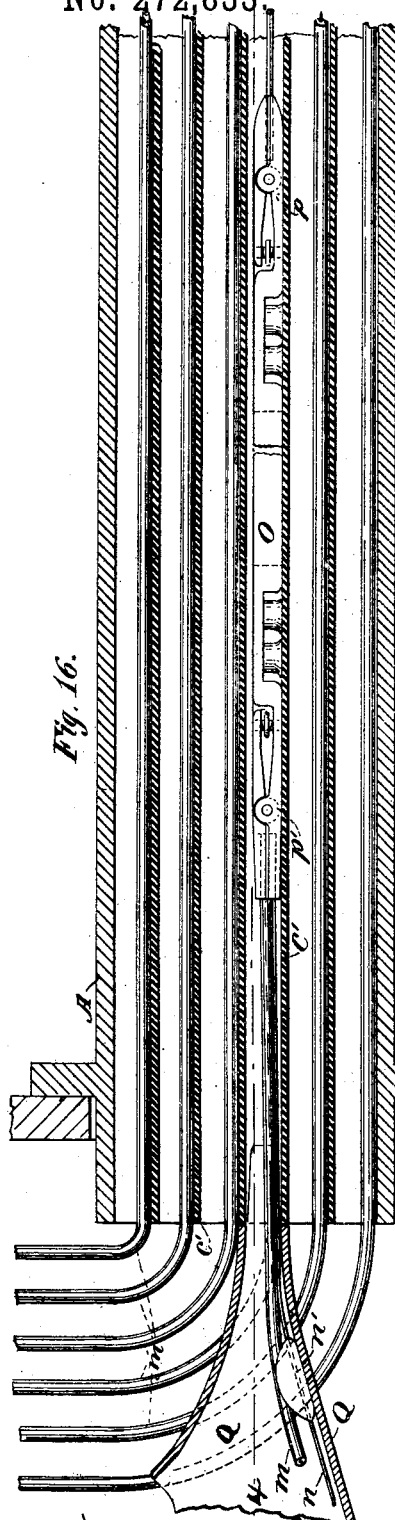
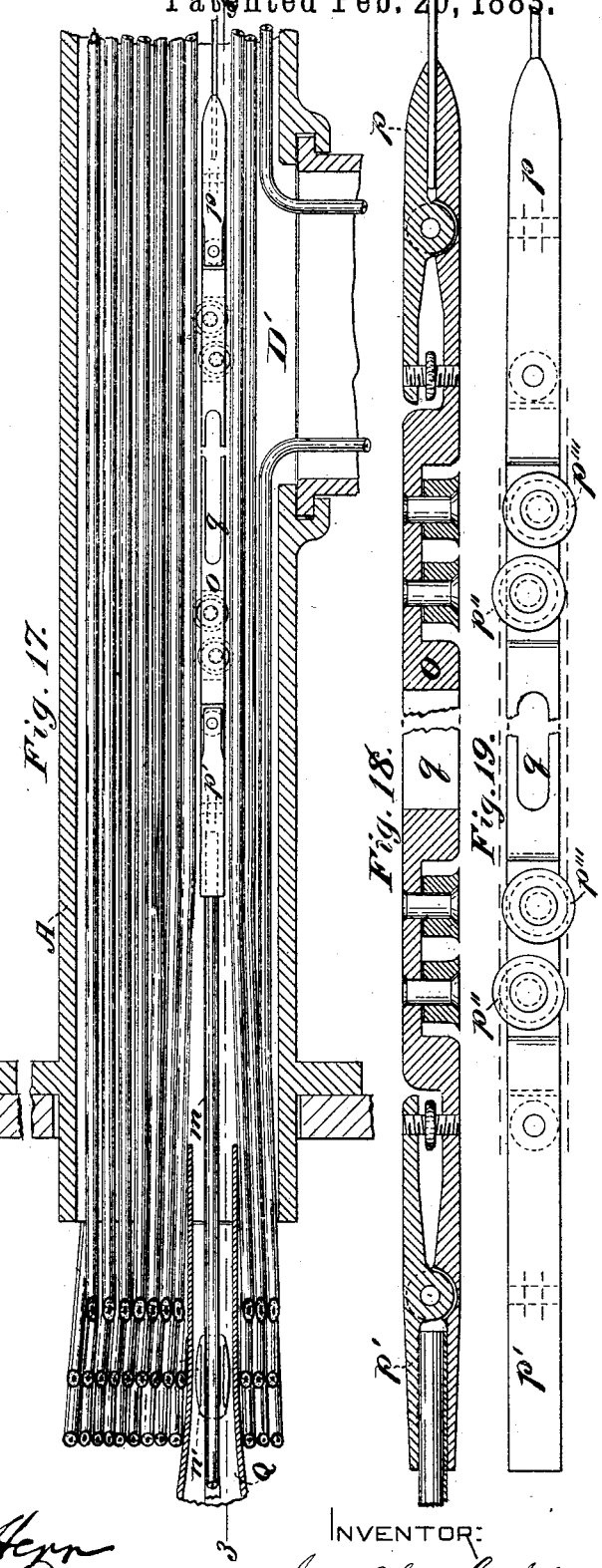

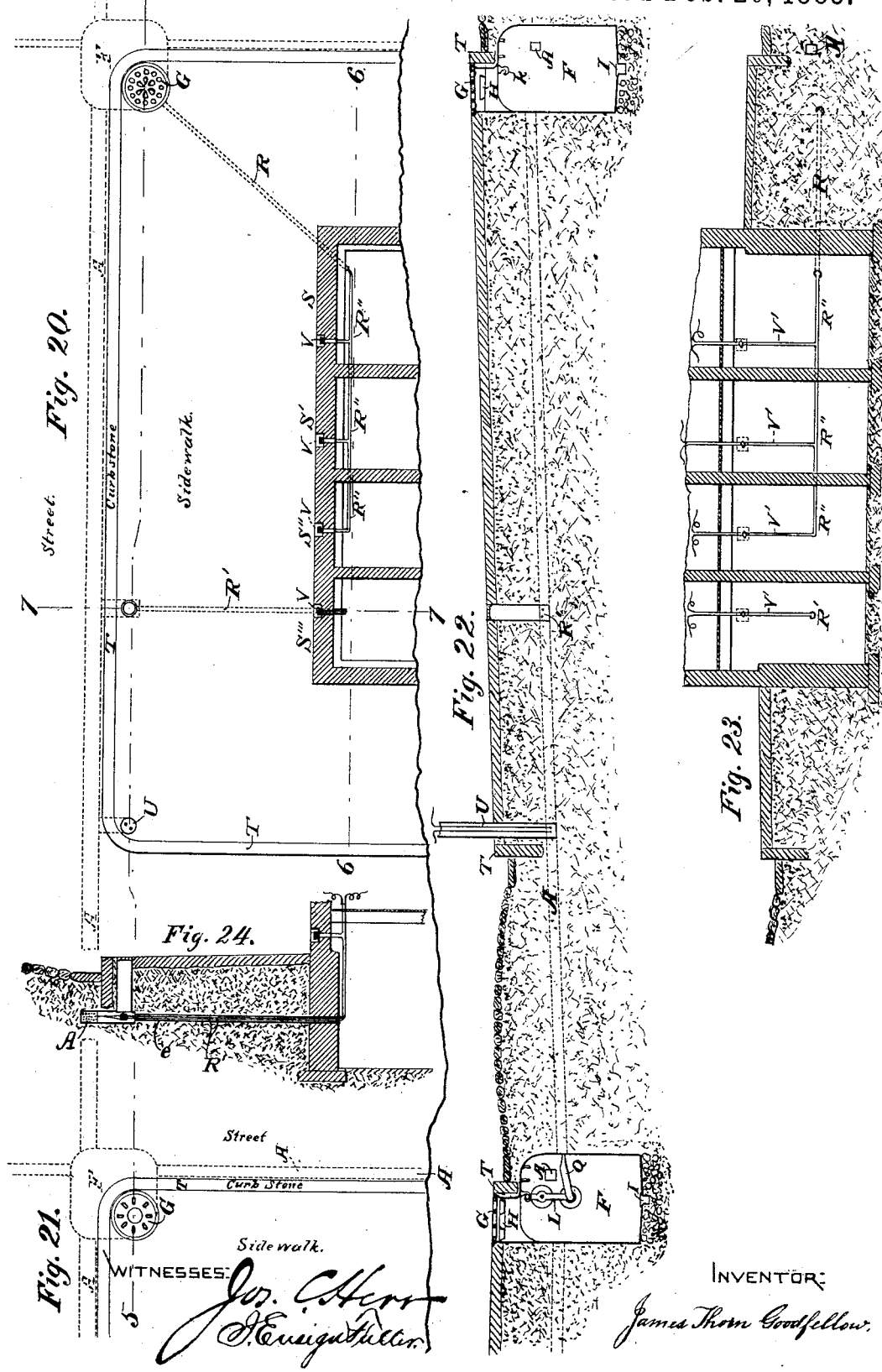

UNITED STATES PATENT OFFICE.

JAMES T. GOODFELLOW, OF PHILADELPHIA, PENNSYLVANIA.

SYSTEM OF LAYING SUBTERRANEAN LINES OF ELECTRIC WIRES.

SPECIFICATION forming part of Letters Patent No. 272,833, dated February 20, 1883.

Application filed January 18, 1883. (No model.)

*To all whom it may concern:*

Be it known that I, JAMES THORN GOODFELLOW, a citizen of the United States, and a resident of Philadelphia, Pennsylvania, have invented a new and Improved System of Laying Subterranean Lines of Electric Wires, of which the following is a description, reference being had to the accompanying drawings, forming a part of this specification.

The nature and object of my improvements will be set forth in the following specification and claims.

In the drawings referred to, Sheet 1, Figure 1 represents a detached perspective view of a portion of a tube, conduit, or casing with its shelves, and showing, also, a side branch of one of the wires from the upper shelf; Fig. 2, a similar view, showing another method of branching a wire from any shelf or tier of wires to its termination; Fig. 3, a sectional perspective view of a portion of my improved tube or casing with its shelves and wires in place therein; Fig. 4, a view similar to that shown in Fig. 2, but with no wires therein, and with its side opening for a branch closed with a slide-gate; Fig. 5, a detached view of a portion of one side plate of my improved conduit-casing; Fig. 6, a perspective view of a triple form of my improved conduit-casing, showing adjoining passages side by side; Fig. 7, a small section or part of my sheet-metal shelves for supporting wires in the conduit, showing the manner of connecting the ends of the sheets of metal by riveting; Fig. 8, a similar view, showing the joining of the ends of the sheets of metal by means of bands or loops passed into edge slots formed in the said sheets near their contiguous ends. In Sheet 2, Fig. 9 is a sectional elevation of a working-pit and its man-hole, designed to be placed at intervals along the line of conduits and at their intersections, showing a frame with reels therein swung into place from overhanging hooks and in position to feed wire therefrom into a conduit; Fig. 10, a similar view, showing the reel-frame and its reels in place therein from the rear. In Sheet 3, Fig. 11 is a horizontal sectional view of a working-pit on the line 1 1 of Fig. 9, showing a reel in position for feeding wire into a conduit; Fig. 12, a plan view of a street-corner at curbstone, with man-hole cover, and plan of working-pit beneath the man-hole and conduits branching therefrom in dotted lines; Fig. 13, a side elevation and partial sectional view of a section of wire-carrying band, with small saddles attached thereto, and sustaining therein a short section of insulated electric wire; Fig. 14, a section of the same at the line 2 2, Figs. 13 and 15; Fig. 15, a top or plan view of the same. Sheet 4: Fig. 16 is a longitudinal vertical section of an end portion of a conduit through line 3 3, Fig. 17, showing casing-shelves and the wires in place thereupon and the method of inserting a new wire; Fig. 17, a longitudinal horizontal section of the same on line 4 4, Fig. 16, showing the several tiers of wires in cross-section as coming out of conduit and a new one being laid; Fig. 18, a central longitudinal vertical sectional view of the guide-needle furnished with a clamp at each end, one clamp to grasp the wire to be laid, while the other clasps the draw-wire; Fig. 19, a bottom view of the same, showing the friction-wheels for decreasing the friction of the guide-needle upon the old wires as it is drawn through. Sheet 5: Fig. 20 is a plan view of one block of ground furnished with my system, showing fronts of houses in horizontal section, to illustrate a method of communicating from conduit to houses and from house to house. Fig. 21 is a plan view of a street-corner adjacent to the working-pit, showing the top or cover of a man-hole thereat and the line of curbstone, and is really a part of Fig. 20, designed to render Fig. 22 more intelligible; Fig. 22, a vertical longitudinal sectional view through line 5 5, Figs. 20, 21, and 24, showing my system, the conduit-casing (in dotted lines) to be laid beneath the street, also showing the pitch or gradual depression of the casing from one working-pit to another for running off moisture—in other words, for its drainage; Fig. 23, also a vertical sectional view through line 6 6, Fig. 20, having the same object as Fig. 20; Fig. 24, a vertical sectional view on line 7 7, Fig. 20, of a front cellar-wall and sidewalk, with a branch from the main line of wires in the conduit, showing a method of breaking connection or switching the current from a house.

In various of the figures, A is the casing or shell of the conduit, which is composed of parts A' A² A³, (see Fig. 1,) each of which parts is shaped in cross-section like a cross-section of channel-iron. Thus C, as shown in Fig. 5, and when joined together edge to edge, as shown in Figs. 1, 2, 3, and 4, makes a conduit having a rectangular form in its cross-section, having its joints extending along at or near the middle of its top and bottom sides. Along the meeting edges $a$ of each of the parts of the conduit A is provided outside projecting and alternately interlocking projections or lips, $a'$ and $a''$, shaped, arranged, and adapted to lap over the opposite edge of the opposite part of the conduit-case, thus to hold the meeting edges $a$ in constant contact with each other, and at the same time to prevent any endwise movement of the parts of the case A upon each other, and also to form a practically continuous cleat, so to speak, overlapping the joint $a$, to prevent the oozing or sifting of dirt therethrough into the conduit. Still the joint in the bottom of the conduit permits any moisture in the conduit to escape or to leak away into the earth below. For the purpose of fastening the opposite side parts of the conduit-case securely together, each of such parts is provided at suitable intervals along their upper and lower edges with outwardly-projecting and interlocking lugs or hooks $b\ b'\ b''$, and adapted to be secured together by means of pins $b'''$, (which pins may be simply short rods of iron or a common cut nail,) being driven into place, as shown in Figs. 1, 2, and 4. It is evident that as the hooks $b\ b'\ b''$ are open the pin $b'''$ can always be reached, as it is exposed for nearly its whole length, whereby in the event of its rusting in the hooks, so as to render it incapable of being driven out by its end, it can be cut with a chisel at the points where it passes from one hook to another—that is, where it is exposed. It is obvious that by this device the use of bolts, with their attendant expense and difficulties arising from the rusting of their threads, is avoided.

Although I do not confine myself to any exact location of the lugs or hooks $b\ b'\ b''$ along the meeting edges of the parts of the casing A, still I preferably provide each end of each side part $A'\ A'''$ with lugs or hooks $b'\ b''$, and the middle of the opposite side part $A''$ with an intermediate locking-hook, $b$, so that when the opposite side parts of said conduit are secured together the end joints, $z$, Fig. 1, will break joint with each other in such opposite side parts of the conduit, thus securing, so to speak, virtually one continuous casing, which will preserve its alignment and not be apt to have its said alignment materially disturbed by the action of frost. The inside dimension of the conduits, as shown in the various figures, is that of three inches wide and four inches deep. Though of course any desired size may be used.

In Fig. 6, showing a triple conduit, the two outer sides $A'\ A''$ are the same as shown in Figs. 1, 2, 3, 4, and 5; but the intermediate parts, $A^{iv}\ A^{v}$, are I-shaped in cross-section, similar to a cross-section of girder-iron; and the various parts of such a conduit, whether it be double, triple, quadruple, &c., are adapted to be locked together, as above described, with reference to a single conduit—viz., by means of lugs $a'\ a''$ and hooks $b\ b'\ b''$. The interiors of the vertical walls of the parts of the conduit A are provided with longitudinally-arranged ribs $c$, Figs. 5 and 6, designed to support shelves $c'$, which I make of light sheet metal. As indicated by dotted lines at $c''$ in Fig. 6, these ribs may be made solid with the walls of the conduit, and of such width that when the parts of the conduit are put together said ribs will form permanent shelf, in lieu of the sheet-metal shelves $c'$.

Although I do not confine myself to any particular material of which I make my above-described conduit-case, still I prefer to make it of cast-iron, and in which case the parts of the casing A of conduit and parts made solid therewith can be cast solid and without coring, which, in view of economy of production, convenience of handling, and inspection of its interior before putting together, is very desirable. By making the conduit of two parts divided through the middle, as shown at $a$, I am enabled to make both sides from the same pattern.

The shelves $c'$, made of sheet metal, are cut or made of such width as will adapt them to be drawn into and out of their places in the conduit and to rest on the ribs $c$ therein, and their ends are riveted or otherwise secured together, (see Figs. 7 and 8,) so as to form, so to speak, one continuous shelf for the wires, extending the whole length of the conduit. These shelves $c'$ are inserted in their places by means of a draw-wire, which is left in the conduit when it is laid. This wire is attached to one end of the shelf, the end of the shelf inserted in the end of the conduit at one of the working-pits, another or several draw-wires being attached to the first draw-wire or the inserted end of the sheet-metal shelf $c'$, and an operator in the other working-pit then draws upon his end of the draw-wire and pulls the long sheet-metal shelf into its place upon the ribs $c\ c$, the new wires going with it until the inserted shelf and wires reach the farther end of the conduit. A fresh draw-wire, (one of the last ones attached as above named,) lying above or below the length of this shelf, is then used in like manner to draw in another shelf, and so on through the whole series of shelves. Care should be taken to leave a draw-wire upon or below each shelf when the latter is inserted, and one also upon the bottom of the casing to provide for the subsequent insertion of electric wires, as hereinafter more fully described. It is not necessary to insert all or any of the shelves before laying wires in the conduit, as such wires can be laid first upon the floor of the conduit and the shelves above inserted only as they may be required. Although I do not confine myself to any material of which I propose to make my shelves, I at present prefer to use what is known to the trade as "galvanized sheet-iron."

I propose that the length of conduit between working-pits shall be about five hundred feet, more or less, as may be desired. Each section of casing, shelves, and wires will therefore be about that length to reach from working-pit to working-pit. I can place my working-pits at a distance considerably more or less than that named, but have mentioned that distance as being practicable and economical. Although it may be generally desirable to locate a working-pit at each street-crossing, so as to form a terminal for cross-lines of conduits at those points, still the conduit can be laid so as to cross any street without terminating at such a point in a working-pit, and working-pits may be located intermediately between to cross streets whenever desired. I prefer, when practicable, to lay my conduit-casing at a depth of about two feet from the surface of the ground. I name this distance, as frost will not do any material injury to my device or the wires, and as the gas and water service in most of the cities in the northern latitudes is laid at a considerably greater depth, to be below what is known as the "frost-line," all interference with such gas, water, and other service will be avoided in laying my conduit at the depth of said two feet.

As to the location in the street for my conduit, I prefer to lay it at the side of the street, just outside of the curbstone, thus avoiding the necessity of disturbing expensive sidewalk-pavements when laying conduits or when making any subsequent connection with the conduit for house or other service. Nevertheless, when occasion may require, or it may be for some local reason preferable, I lay my conduit beneath the sidewalk, near the curb, or next the front wall of the houses, or through the cellars, at or near the inside of the front wall; or I can support it upon poles or other supports at suitable distances apart. The contraction and expansion of the conduit incident to changes of temperature are taken up in the loose-fitting joints between the locking-projections of the conduit, as heretofore described. The pitch for drainage, heretofore referred to, I would generally make conform to that of the street, whether such pitch or depression is from one working-pit to the other or from midway of such working-pits both ways of each of such pits, the object being in all cases to form, in laying the conduit, no hollows therein for the accumulation of stagnant water.

For the purpose of effecting an entrance to the conduit for the purpose of making electrical connection to a street-light or building, &c., I provide the conduit-case A, at suitable distances apart, with hand-opening D at its top, or D′ at its side, which, when the conduit is laid, is capped with a flanged plate, d, if at the top, or slide-plate d′, adapted to be inserted into grooves d″, if at the side. When it is desired at any time after the conduit is laid to make a branch connection for street or house service, the street above one of these hand-holes is excavated as for gas or water service, the cap d or slide d′, as the case may be, is removed, and a wire, being run from the working-pit from which such conduit leads, is connected with a suitable wire, also run from the place of service, and preferably inclosed in a tube or case, e, from building to conduit, so as to afford ready passage for any other subsequent wires therethrough, if so desired. When the conduit is laid next to the wall of a building or vault under sidewalk, the hand-holes D or D′ can be readily reached for branch connection by simply cutting a hole through the wall at such point, thus avoiding the necessity of excavating; or when the conduit is laid through buildings, as above intimated, the covers for hand-holes can be securely fastened in place to prevent tampering with the contents of conduit. It is not necessary in my improved conduit or system of laying wire therein, when such conduit is laid through buildings or sidewalk-vaults, to trespass upon private property for the purpose of running wires from one work-pit to another, and service-connection can at any time be made therewith without necessitating any excavating or the cutting through of walls in so doing. As the shelves and wires all have to be inserted in the conduit from the working-pits, I will now describe their construction.

The views shown in Figs. 9 and 10, Sheet 2, and 11 and 12, Sheet 3, illustrate the manner of construction.

The working-pit F is dug about seven feet deep by about four and one-half feet in diameter, or across, if square, and they may be round, square, or any desired shape. As strong electric currents will be continuously passing through them, I prefer to line each of them with metal—say cast-iron—to furnish a good conductor to the ground, as at f, Figs. 9, 10, and 11. They may be lined with masonry, if desired, and the hooks or racks, which support the wires passing from conduit to conduit in the pit, may be connected with the ground by metal rods or plates, to carry off the excess of induced electricity. A removable man-hole cover, G, of suitable form or shape, closes each of these pits at the top. This cover is furnished with a glass bull's eye or eyes, g, to give light to the workman within, and also with an opening or openings, g′, to effect ventilation. Each man-hole cover over every working-pit is furnished with openings, and, since it is designed to place a working-pit so ventilated at an average of every four or five hundred feet of conduit A in my system, it is apparent that a continuous supply of fresh air will be furnished and allowed to circulate not only through my working-pits, but through the hollow conduits A, which open into the various pits, thus preventing the gathering of any foul air. A thorough and systematic circulation of air is sustained throughout the whole system thereby. If one working-pit for any reason has to be kept closed permanently or temporarily, the general circulation from other pits having openings will nevertheless keep the air pure. It will of course be understood that the distances of pits from each other may be much varied from that which I have mentioned. Eight hundred, a thousand, or more feet may be, span the distance from pit to pit; but the numerous openings in manhole covers will still support the circulation of air. To keep out dirt, a pan or pans, H, are sustained in an open frame under these openings g', which, when the cover G is removed, will also have to be removed before the workman can enter. Thus the pans may be emptied of their contents every time the pit is opened. An ordinary waste-pipe or opening, I, below leads to the street-sewer, a pit, or to leach away into the ground to permit the escape of water, either that of condensation coming from the casings A or that coming from other sources. Each pit is furnished with a work-shelf, J, for the workman, and tools may be kept there or brought along for use. This work-shelf also serves as a step to assist the workman in entering and departing from the pit F. The pit shown in Figs. 9, 10, 12, 20, and 21, is, I will say, at the corner of a street, with its opening, if possible, just inside the curb in the sidewalk, to avoid the entry of street or gutter water. (See Fig. 12, Sheet 3.) As will be seen in Fig. 11, there are four casings or conduits A, opening into this pit from different directions.

Having thus set forth the construction of the casing or conduits A and the man-holes and pits and the manner in which the shelves are inserted, I will now describe the manner of inserting the insulated wire.

The wire I use is such as is suitable for telegraphs, telephones, electric lights, singly or in cable form, and is coated with a non-conducting material, then covered with a flexible metal, preferably lead, as a protection to the insulating substance from the effects of moisture or abrasion, and to carry off induced currents.

It is a fact well known to those familiar with the subject of the conduction of electricity through wires, that when a number of such wires are carried in close proximity to each other they cannot be too well insulated, and that even so insulated the induced electric currents thus set up in adjacent wires is such as to materially affect their proper conduct, and that it is essential that each such electric wire, in addition to its insulator, should have some outside armor or good conductor of electricity to convey the induction set up by the passage of electric currents through the wire to the ground as readily as possible. Hence, the metallic casting or armor of the wires such as I propose using in my improved system being in direct contact with the metallic shell c' and the shells c' in contact with the metal of the conduit-casing A, facility is afforded for immediately grounding all induced currents arising from the passage of electricity through or over the wires. This insulated wire is well known to the trade and in the arts. It requires careful handling to insure the retention intact of its insulating and protection coatings, and it is advisable to subject it to as little abrasive friction as possible.

In the interior of the roof of each working-pit I show in place four hooks, K K K' K', Figs. 9 and 10, two of which are opposite each two opposite openings of conduits in such position that a reel suspended from the hooks will hang opposite the said two openings. The operator brings with him his tools and the double reel. The wheels forming the double reels are hung in one frame L, (see Figs. 9 and 10,) and the upper wheel, M, has wound upon it the insulated wire m, while the lower one, N, carries the flexible flat tape n, preferably of steel, of a character similar to that used by surveyors, forming a carrier for the whole wire. (See also Figs. 13, 14, and 15, Sheet 3.) The tape n is furnished, at suitable intervals to prevent the wire leaving it, with saddles n', in which and upon the tape the insulated wire rests as the tape and it together are drawn into the casing A. This frame L and its reel or reels is suspended by the ends of its cross-piece l from two of the hooks, as shown in Figs. 9 and 10, Sheet 2, opposite to the opening of the casing A, which is to be furnished with a wire. A guide-needle, O, (see Figs. 16, 17, 18, 19, Sheet 4.) is furnished at each end with suitable grips or clamps, p p', and beneath with horizontal outwardly-projecting side friction-rollers, p'' p''', the rollers p'' serving to ease the friction of the needle O against the wires already laid upon one side, and the rollers p''' answering the same purpose upon the other side. One of these guide-needles O is now clamped by one of its ends, p, to the near end of one of the draw-wires lying on the bottom of the conduit or one of the shells c', which is to be furnished with a wire, and the other end, p', of the needle is clamped to the adjoining ends of the insulated wire m and of the tape n, which sustains or carries such wire m. The operator in the next work-pit then draws upon his end of the draw-wire, having been warned through the casing as though in a speaking-tube, and the insulated wire is drawn in place. As a precaution against depriving the shelf of its draw-wire, another draw-wire is attached to the last end of the draw-wire being used before the latter is drawn through, or to the needle, and allowed to remain upon the shelf, ready for the next operation. The operator who drew the wire through then detaches the needle O. Having secured the forward end of the electrical wire m, the tape is withdrawn, and the insulated wire is then ready for attachment to any other wire, or to a house, street-lamp, or other connection, if it be for the purpose of an electric light, or to a telegraph-instrument connection or telephone-instrument, as the case may be; or if it is desired to carry it still farther to a distant connection, another section is inserted into the entrance to the next conduit. A needle O is attached to its ends and to that of a carrier— viz., tape n', having saddles n. A needle O is then clamped upon the end of another draw-wire, and the operation above described is repeated, and so on until the far end of the electric wire has reached its terminus in the conduit opposite an opening, when it is to branch therefrom for street or house service. When the distance to which the wire m is so short as not to have its metallic armor materially abraded, the use of the carrier n may be dispensed with in drawing the wire through or into the conduit. As the floor of the conduit and the shelves c are likely to be quite rough, the carrier n, which is so smooth as not to abrade the armor of the wire m when the carrier is withdrawn from beneath the wire m, it is obvious that such wire can be laid on the rough floor and shelves of the conduit without injury to its metallic armor or coating.

If preferred, a draw-wire, after pulling the wire m and carriers n through the conduit, can have its end attached to the end of the carriers and be there withdrawn back again to be used in drawing a fresh wire through the conduit. For the purpose of turning the reel N back so as to rewind thereon the carrier n, I show in dotted lines in Figs. 9, 10, and 11 a handle, n'', which I preferably make detachable from the shaft n'''' of the reel N.

In Figs. 9, 11, and 22 I show a wire and carrier entering guide Q, secured at its wider end to the reel-frame L, at and on opposite sides of the journal of the carrier-reel N, and jointed thereat, so as to be adapted to have its nose elevated or depressed at any desired angle for guiding the wire and its carrier to their place in the conduit regardless of the height of which the end of the conduit may enter the working-pits. The shape of the guide Q is such that as the wire or carrier is unwound from the reels in being drawn into the conduit will cause the wire m to be laid inside the saddles n' on the carrier n. The lower and upper ends of the nose of the guide Q rest against edge or ends of the conduit or shelves. The side cheeks of the nose of the guide are extended sufficiently to enter a short distance into the end of the conduit, so as to hold the nose in its place while the wire, &c., are being fed into the conduit and while the carrier is being withdrawn therefrom. This guide also forms a shield for the protection of the wires already in place entering or leaving the conduit from being abraded by the passage of the wire and its carrier while being fed into place in the conduit.

In the feeding-needle I show an open space or slot, g, with a view to lighten its weight, and also to serve for the purpose of inserting a brush for clearing or cleaning a part of the wire and carrier, if required, and also for holding a sponge or waste saturated with some suitable lubricant for reducing the friction of the wire-carrier when being drawn through the conduit, or a lubricant of a soft solid nature may be laid therein, as may be found desirable.

The reel-frame L with its reels M N and carrier n, guide-needle O, and guide Q are portable tools, which the operator can carry with him from one pit to another, as he desires, and hence the necessity of having in each pit any fixtures or mechanism made permanent therein for working the wires is avoided.

My improved system enables the running of wire along the streets of cities without necessarily impeding the travel therethrough in so doing, as all work can be entirely beneath the street-surface.

As the vertical dimensions of the conduit need not be more than a few inches in depth— say from three to six inches—and of any desired width, according to the number of wires it may be desired to accommodate, it is obvious that it can much easier pass obstructions— such as pipes, &c.—than if it were of considerably greater depth, and in case the excavating of a trench in rock for the conduit should be necessary it will only require the making such trench very shallow.

The details of my construction being thus set forth, I will describe their combination, or the relation which they will occupy to each other in practice, so as to constitute a system.

Sheet 5 of the drawings shows the arrangement of my conduits and the wires and the styles of branching off and carrying them into and through buildings.

A is the conduit containing the wires; G, the covers to the man-holes over the working-pits. R R', are branches from the main conduit into the buildings S S' S'' S'''. The branch R passes from a conduit-opening in the working-pit, beneath the cover G, into the building S, through the cellar-wall of the latter at a point at about two feet beneath the surface of the sidewalk. The wire so branched off passes into the cellar of the building S, and thence through the dividing cellar-walls into buildings or houses S' S'' on about a horizontal line, R''. Short branches are then made from the wire or line R'' up into the buildings, preferably close against the inside of the front walls of the latter, which latter branches pass upward to an electric light, telephone, or telegraphic instrument, as the case may be. At a short distance above the plane of the sidewalk, in the front wall of the building, a polygonal head or box, V, projects, upon or in which a key can be fitted to turn it. This head or box is connected within with a switch upon the electric wire opposite to which it is set, whereby the electric current from the wire R'' can be checked or stopped off from communication or use in the building in the wall of which such switch is placed, while the adjoining building can be uninterruptedly supplied with the electric current passing along the wire R''. By these means any one or more buildings in a block can be separately cut off from the outside, at pleasure, from use of the current without interfering with others.

T represents the curbstone bounding the sidewalk of a block of buildings, the working-pit being at the corner, beneath the cover G, and the conduit A being set immediately outside and below the level of the curbstone T.

U at one corner of the sidewalk represents an opening from a short branch from the main conduit, upon which the street electric lamp, with its supporting-post, can be set. R' shows a branch from the main conduit to a single building for any of the purposes above named. The manner of making these branches R' or U is as follows: In making the branch at R' or U, which I denominate a "local branch," as it is from a point lying between two working-pits, I first excavate the ground immediately above the conduit until I reach the latter, and then open a cap, slide, or gate in the latter, such as is shown at $d$, Fig. 1, or at $d'$, Fig. 4, Sheet 1. I will here interpolate that in laying my wires in the conduits I prefer to place all my wires which are to be used locally or between man-holes upon the upper shelf of the conduit, and the through-lines of wires upon the shelves beneath when the hand-hole is at top of conduit. (See D, Fig. 1.) Any local wire can then be easily carried out of the conduit from the top of the latter, as shown at D, Fig. 1, through the branch $e$ without disturbing its neighboring wires, whether it be taken from one or the other side of the conduit; or, if preferred, the local wires can be laid upon each or every shelf; but in such case they should always be placed upon that side of the shelf from which they are likely to be drawn for branches, so as not to interfere with others, and the through-wires should be laid upon the other sides of the shelves. In the latter event I should use the side slide or gate shown at $d'$, Fig 4. It is of course presumed that the operator employed to make these branches and to superintend the practical operation of the system shall be either a competent engineer or one so skilled in the business as to be able to exercise a superior judgment in manipulating the various constructions required. After the conduit is reached by excavating, the cap $d$, Fig. 1, say, is removed. A hole is then made through the cellar-wall of the house to be furnished with a wire, opposite the excavation above mentioned, and an earth-boring tool is then used to bore a hole from the cellar to the opening for the branch pipe $e$ in the box D, the other end being placed in the end of the hole just bored, the boring-tool having been withdrawn. An electric insulated wire is then drawn upon the shelf from which the branch is to be made by means of a draw-wire in the manner before described, and when the wire has been drawn through the conduit to the point where box D is situated it is drawn out and forced through the branch pipe $e$ and the bored hole into the cellar, where it can be connected with a wire or wires conducting to any part of the building, or with a section of wire, in addition, conducting to adjoining buildings, as above described with reference to connection-wire R''.

If preferred, instead of forcing the wire from the conduit through branch $e$ and the hole to the house, a short section of insulated wire can be forced from the cellar through the boring or hole to the conduit, and connection can there be made between the section of wire so driven and the wire in the conduit. When the connection of the conduit-wire with the interior of the building is completed the cap $d$ is replaced over box D and the excavation is filled up. When a branch such as is shown at R, Fig. 20, Sheet 5, is to be made, a hole is bored from the cellar to the working-pit under the man-hole cover G, and wire forced through the hole to the pit, as above described with reference to branch $e$, and the connection with the building is made from the man-hole. The dip of the conduit from one pit to another for drainage of the conduit is shown in the view Fig. 22, Sheet 5, where two working-pits, F F, are shown, showing the depression in the line of conduit from right to left.

In my system all kinds of wire can be laid side by side upon the same shelf—viz., telephonic, electric, and telegraphic wires. The shelves and conduit-casing being of metal, and each wire being insulated and then coated with metal, there is at all points of the line a continuous, direct, and immediate metallic ground-connection from the wires, which will instantly carry off and ground any induced electric current arising at any point. Therefore a strong electric current passing, I will say, through an electric-light wire, will not interfere with the action of a weak current passing through telephonic wires laid upon the same shelf immediately beside it. It will also be observed that a single wire can be laid in the conduits for any desired distance with even greater speed and safety than it can be set upon poles. This feature of my invention enables the owners of the system to lay single wires from time to time, as necessity arises, without tearing up streets for long distances to accomplish it, and obviates the necessity for laying a great number of wires when making the conduits in expectation or anticipation of possibly long delayed future demands, and thus allowing a large capital to remain invested and useless for long periods. By lettering or numbering the shelves and numbering each wire as it is laid upon its shelf, and then noting its destination, a complete record can be kept, and any wire can be immediately identified at any working-pit. An inspector can thus, by referring to his pocket-record of the wires duly numbered, tell the destination of any wire in the whole system, and by means of the map of the system and its wires can by reference thereto trace the direction and course traversed by any wire in all the turnings it may take, what streets it passes through, and what corners it turns.

The working-pits can be lighted by any ordinary means or by an electric light. If a hand-lantern be used by the operator, he can support it upon the work-bench in the pit or suspend it from one of the hooks overhead. This lighting may be necessary for night-work, or when the light from the bull's-eyes in the man-hole covers is found to be insufficient. Work can thus be carried on in the pits at all hours of the day or night.

I purpose covering in a separate patent the conduit formed of cast sections or plates in the form of channel-iron, (thus ⊏,) the longitudinal joints being formed in the middle of the top and bottom of the conduit.

I am well acquainted with the device shown in English Patent No. 2,759 of 1859, and do not claim that device, as each shelf therein is made up of disconnected sections or pieces longitudinally. By my system of running or passing a branch wire from the conduit to one of a row of buildings, then passing a connecting-wire horizontally through the others, and passing a separate wire upward from this horizontal wire into each building, such separate wire being furnished with a switch passing through the front wall of the building to the outside, I am enabled to shut off the supply of electric fluid from any building at will without disturbing the supply to the rest, and only one break in the conduit is required for the branch. At the same time the supply can be broken off from any one building from the outside thereof, if desired. This device I shall protect by a separate patent.

What I claim as new is—

1. A plate, A', composed of a full side and two similarly-projecting flanges, the latter being furnished with projecting hooks $b'$ $b''$, locked as described, formed thereon, whereby, when the plate is united to a similar opposite plate at its edges by means of the locking-pieces $b'$ $b''$, a hollow conduit will be formed, the joint between the long meeting edges of the plates passing longitudinally about half-way across at the top and bottom of the space inclosed, substantially as described.

2. A conduit or casing, A, for subterranean electric wires, having several passages side by side (see Fig. 6, Sheet 1) formed of plates, the middle ones of which are shaped like short sections of girder-iron, (I,) and the outer plates to close and complete the outer passages shaped like short sections of channel-iron, (⊏,) said plates being furnished with suitable fastenings to unite them to each other, said plates being formed of cast-iron, and having cast upon their vertical webs the inside ribs, $c$, for the purposes described, whereby, when the plates are joined together to form conduit, the inside ribs, $c$, are opposite to each other, the inclosed passages for the wires being formed by the meeting of the opposite flanges or long edges of the various plates, substantially as described.

3. A conduit, A, for conveying subterranean electric wires, composed of opposite plates A' A'', so constructed that by the meeting of their edges an inclosed passage-way is formed, each plate being furnished at suitable points upon its long edges with hooks $b'$ $b'$, projecting forward over the edge, whereby, when the edges of opposite plates are brought into contact, the hooks of one plate pass slightly beyond and adjacent to those of the opposite plate, adapted to be there held by a pin, $b'''$, and the opposite plates are thus secured against parting until the pin $b'''$, if used, is removed, substantially as described.

4. A conduit, A, for conveying subterranean electric wires, composed of opposite plates A' A'', so constructed that by the meeting of their edges an inclosed passage-way is formed, each plate being furnished upon its long edges with forwardly-projecting lips $a'$ $a''$, which, when the edges of opposite plates meet, overlap alternately, first from one plate then from the other, upon the edge of the opposite plate over the joint formed by the meeting edges, substantially as described.

5. A conduit, A, for conveying or conducting subterranean electric wires, composed of opposite plates A' A'', so constructed that by the meeting of their edges an inclosed passage-way is formed, each plate being furnished at suitable points upon its long edges with hooks $b'$ $b'$, projecting forward over the edge, whereby, when the edges of opposite plates are brought into contact, the hooks of one plate pass slightly beyond and adjacent to those of the opposite plate, adapted to be there held by a pin, $b'''$, to hold the plates together, each plate also being provided upon its long edge, between the hooks $b'$ $b'$, with forwardly-projecting lips $a'$ $a''$, which, when the edges of opposite plates meet, overlap alternately, first from one plate and then from the other, upon the edge of the opposite plate, thus covering the joint formed by the meeting edges, spaces being left between the lips $a'$ $a''$ of one plate to receive the lips from the edge of the opposite plate, substantially as described.

6. In a conduit, A, for conveying subterranean electric wires, a system of continuous plain, flat, thin, side ribs, $c$, cast upon the opposite sides of the conduit A, adapted to support the shelves $c'$, whereby, when the shelves are drawn into place, the continuity of the ribs will not prevent points or ends against which the shelves may abut in being drawn in, substantially as described.

7. A conduit or casing, A, for conveying or conducting subterranean electric wires, said casing or conduit being composed of plates A' A'', &c., and each of said plates being furnished with continuous internal side ribs cast upon the inside of the vertical portions of the plates and integral therewith, substantially as and for the purposes described.

8. In combination with a conduit or casing, A, for conducting subterranean electric wires, a continuous flexible sheet-metal shelf, $c'$, set upon suitable side supporting-ribs, $c$, in the conduit A to sustain the electric wires, substantially as described.

9. In a conduit, A, for conducting subterranean electric wires, a shelf or shelves, $c'$, formed of separate sections of metal joined and attached one to the other, whereby the shelves are adapted to be drawn into the conduits and be sustained upon suitable supporting ribs, c, in distinction to being pushed in, substantially as described.

10. In a system of subterranean electric wires, in the continuous carrier n, for carrying the electric wire from the point of its entrance into a conduit, A, throughout its traverse in said conduit, said carrier being provided with suitable side supports, n', for the wire, whereby the latter is prevented from rolling off laterally, by means of which carrier the wire is supported and preserved for its whole length from frictional contact with the surface upon which it is to be laid, substantially as described.

11. In combination with a system of subterranean conduits in which electric wires are to be laid, a guide-needle, O, broader in diameter than the electric wire to be laid, adapted to be attached at one end to the latter, and at the other end a suitable mechanism for drawing it and its attached electric wire through the conduit, whereby the wire being drawn through the conduit is guided in its course, and has a lane or clear path made for it through or between wires which may already have been laid upon the same surface, substantially as described.

12. In combination with a system of subterranean conduits in which electric wires are to be laid, the needle O, provided at one or both of its ends with a clamp or clamps, P P', as and for the purposes described.

13. In combination with a system of subterranean conduits into which electric wires are to be laid, a needle, O, provided with side friction-rollers, P'' P''', the said needle, with its rollers, being wider than the diameter of the wire to be laid, the rollers serving to decrease the friction of the needle upon any wires already laid and between which it may be passing, substantially as described.

14. In combination with a system of subterranean conduits in which electric wires are to be laid, a needle, O, adapted to be attached to the end of an electric wire to be drawn through the conduit, and provided with a slot or opening, q, in which graphite or other suitable lubricating materials may be placed to lubricate the path of the wire being drawn by the needle to avoid abrasion of the wires, substantially as described.

15. In combination with a system of subterranean conduits in which electric wires are to be laid, a continuous carrier, n, for the wire, provided with suitable side supports, n', to preserve the wire from frictional contact with the surface beneath, and a needle, O, broader than the carrier n or the diameter of the wire to be laid, and adapted to grasp the ends of the wire and carrier n and draw them through by means of suitable mechanism attached to the needle O, while at the same time the latter, by its breadth, clears a path between wires already laid and preserves the latter from frictional contact with the carrier n and its supercumbent wire, substantially as described.

16. In combination with the conduit A, the reel N, carrier n, and the guide, which is suitably supported to receive the carrier from said reel, and converges from the part next the reel to a narrow exit, said exit end of the guide Q being adapted to be placed in the entrance of a conduit, whereby, as the carrier n is drawn off from its reel, it is kept in proper position to receive the electric wire m upon its upper surface, and to enable the latter to rest in or between its side support, n', substantially as described.

17. A conduit, A, for conveying subterranean electric wires, composed of opposite plates A' A'' A''', &c., so constructed that by a meeting of their longer edges an inclosed passage-way is formed between them, the plates being so joined that the end joints of the plates upon one side break joint with the end joints of those of the other side—viz., the joint of every two plates of one side of the conduit being opposite to the body of a single plate of the other side thereof—substantially as described.

JAMES THORN GOODFELLOW.

Witnesses:
W. H. JOHNSTONE,
GEORGE E. BUCKLEY.